United States Patent [19]
Tobol et al.

[11] Patent Number: 5,715,934
[45] Date of Patent: Feb. 10, 1998

[54] CD-ROM LABEL WITH POSITIONING MEANS

[75] Inventors: Gretchen Tobol, Grand Island; Omar Attia, Lake View; Brett Ulrich, S. Wales, all of N.Y.

[73] Assignee: Avery Dennison, Pasadena, Calif.

[21] Appl. No.: 488,220

[22] Filed: Jun. 7, 1995

[51] Int. Cl.⁶ .................................................. B65D 85/57
[52] U.S. Cl. .................. 206/232; 40/340; 40/638; 206/308.1
[58] Field of Search .................. 206/308.1, 308.3, 206/387.1, 232, 459.5; 40/638, 340; 428/40.1–40.9, 41.1–41.9, 42.1–42.3, 43

[56] References Cited

U.S. PATENT DOCUMENTS

| | | |
|---|---|---|
| 3,613,142 | 10/1971 | Chaney, Jr. .................. 206/390 |
| 4,385,335 | 5/1983 | Kiemer . |
| 4,385,460 | 5/1983 | Hanna . |
| 4,968,540 | 11/1990 | Linsenbigler .................. 428/43 |
| 5,320,219 | 6/1994 | Ward . |
| 5,322,723 | 6/1994 | Bickett .................. 428/43 |
| 5,341,924 | 8/1994 | Morrone .................. 206/232 |
| 5,489,456 | 2/1996 | Instance .................. 428/43 |

Primary Examiner—Jimmy G. Foster
Attorney, Agent, or Firm—Oppenheimer Poms Smith

[57] ABSTRACT

A label for applying to a CD includes a label adhering section and a detachable centering section integral therewith. The centering section is shaped so that the label registers exactly on center on the CD when the outside edge of the centering section abut the inside surfaces of the portable container in which the CD is housed.

30 Claims, 2 Drawing Sheets

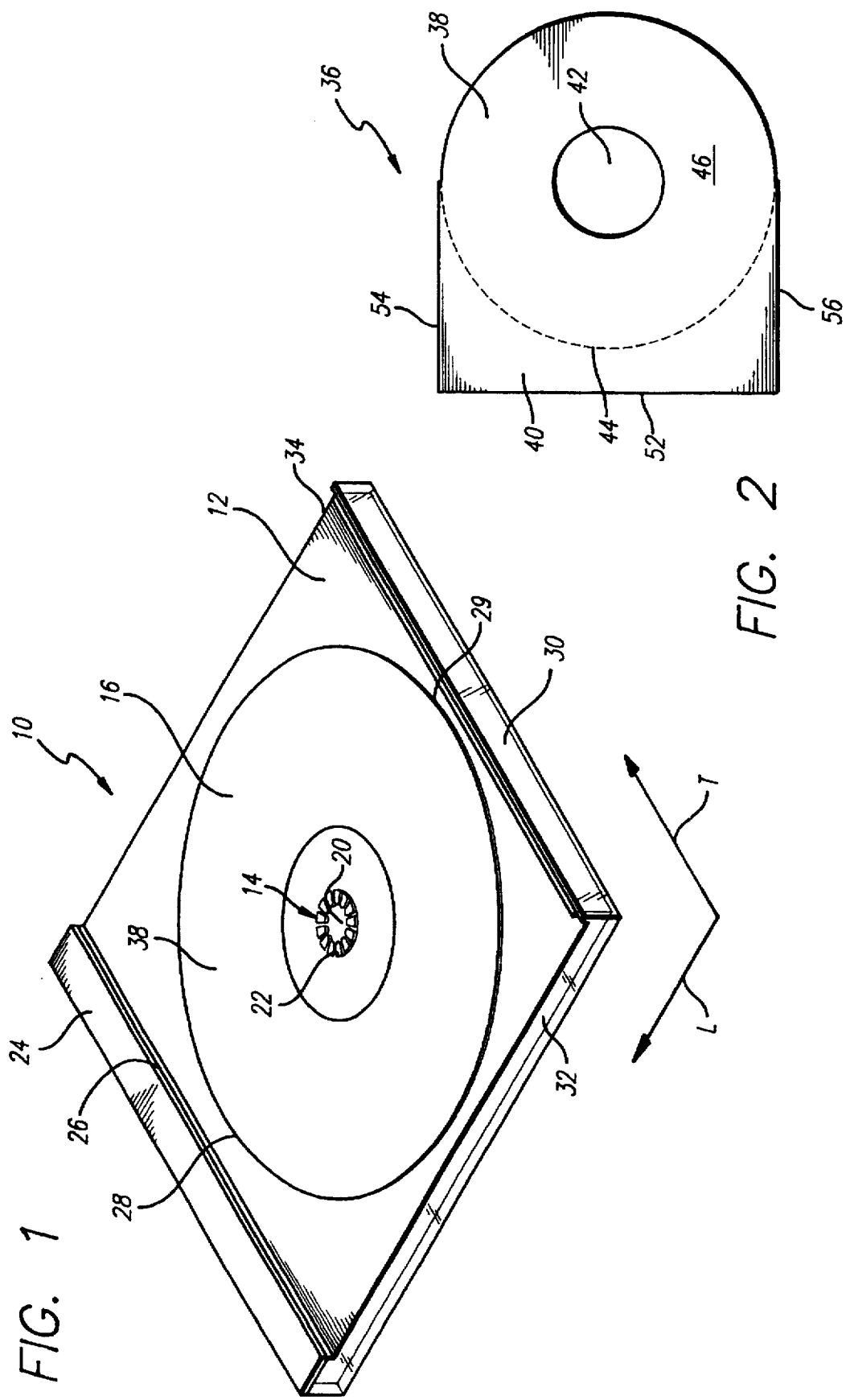

CD-ROM LABEL WITH POSITIONING MEANS

BACKGROUND OF THE INVENTION

The present invention relates to a new technique for applying labels to compact discs and, in addition, a unique, new label for use in this process.

Recently, "write-capable" compact discs (hereinafter "CD's") have been introduced into the consumer marketplace. Using the appropriate equipment, a user can "write" information into the CD itself, which in turn can be "read" by normal CD "players."

To enable a user to identify individual CD's he or she produces, labels may be provided with the write-capable CD's. Typically, such labels comprise annular blank sheets of paper which can be marked by hand on one side to identify the CD and which are provided on the other side with a pressure-sensitive adhesive for attaching the label to the "backside" of the CD.

A problem encountered with this type of label is that it is difficult to position the label exactly "on center" on the CD. An off-center label is disadvantageous since it may lead to nonuniform rotation of the CD in use.

Accordingly, there is a need for a new labelling system to allow the user to easily apply labels exactly on center to CD's, especially write-capable CD's, in the home and/or office environment.

SUMMARY OF THE INVENTION

The present invention relates to a novel label which includes means for automatically centering the label on the CD. Typically, write-capable CD's, like commercially available audio CD's sold in music stores, are supplied in a plastic carrying cases, referred to in the trade as a "jewel cases". In accordance with the present invention, a label for adhering to a CD is provided with "centering section" shaped so that registration of the label centering section with the sides of the jewel box automatically registers the label with the CD contained in the container. Accordingly, the user need only register the centering section of the label in the container in which the CD is housed to exactly register the label on the CD. Once the label is registered in place and adhered to the CD, typically by pressure, the label centering section of the label is removed to provide a labeled CD with the label in place exactly on center.

BRIEF DESCRIPTION OF THE DRAWINGS

The foregoing invention is more thoroughly illustrated by the following drawings in which:

FIG. 1 is a perspective view showing a conventional CD housed in the lower portion of a conventional portable CD storage container;

FIG. 2 is a plan view of the top side of the inventive label of the present invention;

DETAILED DESCRIPTION

Figure 3:
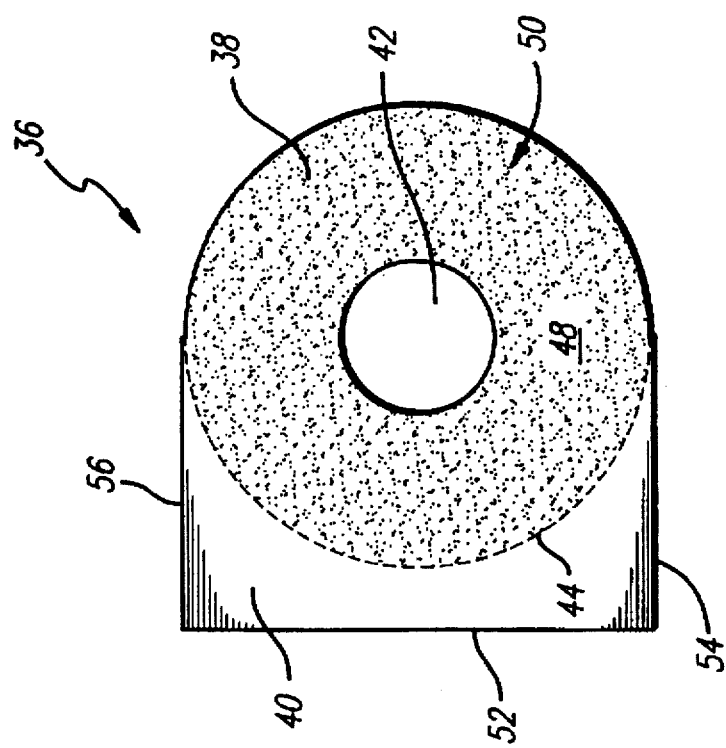
FIG. 3 is a bottom view of the label of FIG. 2.

FIG. 1 shows a portable CD container, generally indicated at 10, which is composed of a container body 12 and a spindle generally indicated at 14. In the particular embodiment shown, the container is a conventional container of the type in which commercially available audio CD's are supplied, with container body 12 comprising an outer clear plastic case and a black plastic insert therein which defines spindle 14 as well as a circular indentation for carrying CD 16. In this embodiment, Spindle 14 is composed of a number of small, centrally-pointing protrusions 22 for capturing and mounting a CD thereon by means of its central opening or aperture. Spindle 14 can also be formed integrally with the remainder of the container, i.e. both can be formed from the same piece of plastic or other material, as desired. Also, spindle 14 can be totally eliminated, if desired, with CD 16 simply being received in the circular indentation in the container body.

As shown in FIG. 1, a CD 16 comprising an essentially flat, circular, piece of plastic defining a round spindle aperture 20 therein is contained in container 10. In particular, CD 16 is mounted by means of its spindle aperture 20 on the projections 22 which collectively form spindle 14.

Container 10 also includes a lid (not shown) which is hingedly attached to one side of container body 12, in particular to side 24 of container body 12. When this lid is in a fully closed position, container 10 defines an internal space which fully encloses CD 16. When the lid is in an open position, the CD can be easily inserted into and removed from the container.

In the particular embodiment illustrated in FIG. 1, side 24 of container body 12 extends above the plane of CD 16 when mounted in container body 12 and therefore defines a bearing face 26 which is arranged to face side 28 of CD 16. In the particular embodiment shown, the plane of CD 16 intersects bearing face 26 of side 24. Other arrangements are possible such as, for example, CD 16 could be arranged when mounted in container 10 so that its plane is below the bottom of bearing face 26, as occurs in conventional, commercially available audio CD containers. So long as bearing face 26 is close enough in terms of vertical arrangement to the plane of CD 16 so as to be available for abutment with the centering section of the inventive label, as more fully described below, it will be taken as "facing" side 28 of CD 16 for the purposes of the invention.

In the same way, side 30 of container body 12 also extends above the plane of the CD and thereby defines a bearing face (not shown in the Figure) arranged to face side 29 of the CD. On the other two sides of container body 12, sides 32 and 34, the sides do not extend above the plane of CD 16. This is because in the particular embodiment shown, it is the lid of the container (not shown) which defines the side surfaces of container 10 facing the adjacent sides of the CD when the lid is in the closed position.

In accordance with the present invention, a novel label is provided for applying to CD 16. This label, generally illustrated at 36 in FIGS. 2 and 3, is composed of a single sheet of material such as paper, plastic or foil which is divided into a CD-adhering section 38 and a centering section 40 adjacent thereto (i.e. in a side-by-side relation as shown in FIGS. 2 and 3) and integral therewith. Centering section 40 of label 36 is provided with an outside edge 52 including lateral edges 54 and 56, while CD adhering section 38 is provided with a label aperture 42 intended to register with the spindle aperture 20 of CD 16. In addition, CD adhering section 38 is separated from centering section 40 by means of a boundary 44 of micro perforations which allow the two sections to be easily detached from one another by hand.

Label 36 defines an upper or first major surface 46 of the label, as shown in FIG. 2, and a lower or second major surface 48 as illustrated in FIG. 3. Upper major surface 46 of the label, at least in CD-adhering section 38, is write-capable, meaning that it can be marked by the user by hand typically with pencil or ink, or if desired by laser or ink jet printer, to supply the desired information thereon identifying the subject matter of CD 16. Lower major surface 48, in CD-section 38 of the label, is provided with a layer of a pressure-sensitive adhesive (either a permanent pressure-sensitive adhesive or a removable pressure-sensitive adhesive) generally indicated at 50 for allowing the CD-adhering section of the label to be securely affixed to CD 16. Examples of suitable pressure-sensitive adhesives include styrene/butadiene rubber, acrylic adhesive and amorphus polyhexane copolymer adhesives. Lower major surface 48 of the label, in label centering section 40 however, is not provided with a pressure-sensitive adhesive since this portion of the label is intended to be removed, as more fully described below.

In use, label adhering section 38 of label 36 is applied to CD 16 when the CD mounted in place in portable container 10, as illustrated in FIG. 1. This is done by placing label 36 on top of CD 16, with adhesive-bearing surface 48 of the label facing the CD. In order to center CD-adhering section 38 of the label exactly in place, the position of label 36 is adjusted, for example by hand, so that outside edge 52 of label centering section 40 abuts bearing face 26 of container body 12. This action automatically centers the label in position with respect to CD 16, at least in the longitudinal direction of the container, as illustrated by arrow L in FIG. 1.

In order to center label 36 on CD 16 in the transverse direction, as illustrated by arrow T in FIG. 1, a number of alternatives are possible. In the particular embodiment shown in which sides 32 and 34 of container body 12 do not provide their own bearing faces facing the CD, this can be done by designing centering section 40 so that lateral edges 54 and 56 register exactly with the planes of side surfaces 32 and 34 of container body 12, i.e. so that the distance between lateral edge 54 and 56 of the label is exactly the same as the width of container body 12. This will allow the user to center label 16 in the transverse direction by simple nudging of one or both lateral edges 54 and 56 of the label, for example, by hand.

Figure 4:
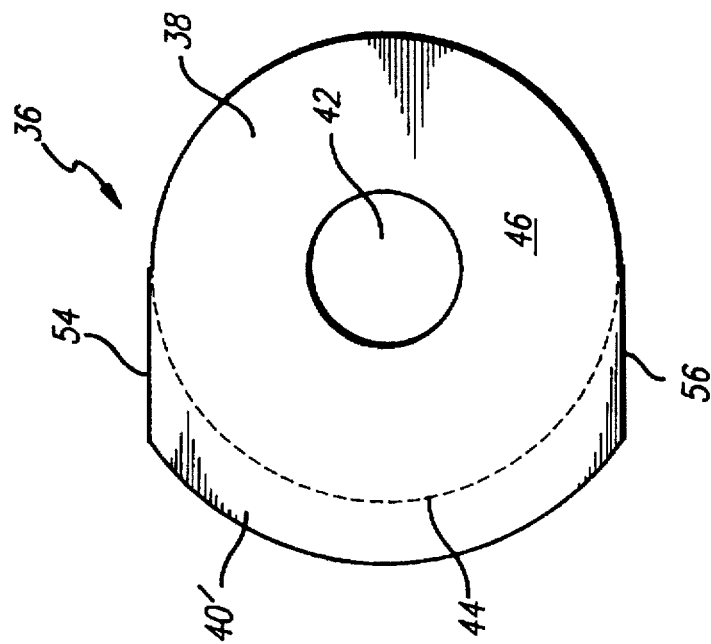
FIG. 4 is a plan view similar to FIG. 2 showing another embodiment of the invention in which a label with a curved outside edge is employed.

Another way for allowing centering of label 16 in both the longitudinal and transverse directions is to use a container 10 whose container body 12 includes sides defining bearing faces 26 in both the longitudinal and transverse directions. Most commonly, this can be done by providing bearing faces 26 located on a common right-angle corner of a container body 12. Other arrangements, however, are possible. For example, bearing faces located at angles more than 90° are also effective as are bearing faces arranged at angles of less than 90° Also, bearing faces which are curved and through their curvature provide guidance in both the longitudinal and transverse direction are also possible. See FIG. 4.

In still another embodiment of the invention, a container body 12 can be used which provides three bearing faces arranged to correspond with outside edge 52 and lateral edges 54 and 56 of label 36 as illustrated in FIGS. 2 and 3. Such an arrangement provides an excellent degree of centering, since the parallel bearing faces of the container abutting lateral edges 54 and 56 of the label prevent any transverse movement of the label whatsoever as it is moved into the proper longitudinal position.

Once label 36 is centered in place as described above, CD adhering section 38 of the label is adhered to CD 16 by application of pressure, for example, by hand. As a result, pressure-sensitive adhesive 50 securely bonds CD adhering section 38 of the label to the CD. Other means of causing adhesion between the label and the CD can be used such as, for example, heat sensitive adhesives, glues (i.e. adhesives which work through evaporation of a liquid carrier), room temperature vulcanizable resins (such as RTV silicones), and the like. Pressure-sensitive adhesives are preferred since they are fast-acting, easy to use and avoid the time and trouble of additional application and/or processing steps.

To complete the application of label 36 of the invention to CD 16, centering section 40 of label 16 is detached from CD-adhering section 30 and discarded. Because of the micro perforation boundary 44 between these two sections, this can easily be done by hand.

Although only a few embodiments of the invention have been described above, it should be appreciated that many modifications can be made without departing from the spirit and scope of the invention. All such modifications are intended to be included within the scope of the present invention, which is to be limited only by the following claims.

I claim:

1. A container and label assembly comprising
   at least one CD,
   a container for said CD, said container defining a bearing surface facing said CD when said CD is received in said container, and
   a label for applying to said CD, said label including a first portion defining a label aperture and a removable second portion having an outside edge remote from said first portion, said second portion shaped so that the label aperture in said label registers with the spindle aperture of said CD when said CD is received in said container and when the outside edge of the label second portion engages said bearing surface, said label being formed from a common flexible sheet of material, said sheet being perforated to define the boundary between the first portion and the second portion of said label.

2. The assembly of claim 1, wherein said sheet is made from paper or plastic.

3. A container and label assembly comprising
   (1) at least one CD having two major surfaces, said CD including a spindle aperture therein for mounting said CD on the spindle of an electric recording or playback machine,
   (2) a portable container for said CD, said container including
      (a) a container body for receiving said CD, said container body including at least one bearing face arranged to face a side of said CD when said CD is mounted in said container,
      (b) a lid for opening and closing said container to allow said CD to be inserted into and removed from said container, and
      (c) mounting means inside said container for mounting said CD in said container, and
   (3) at least one label for applying to said CD, said label having a first major surface and a second major surface opposite said first major surface, said label further defining a CD-adhering section and a centering section having an outside edge, said CD-adhering section and said centering section being integral with but detachable from one another, the CD-adhering section of said label defining a label aperture therein for registering with the spindle aperture in said CD, the first major surface of said label in the CD-adhering section thereof being write-capable, the second major surface of said label in the CD-adhering section thereof carrying an adhesive for securing the CD-adhering section of said label to said CD, the centering section of said label being shaped so that when the outside edge thereof is brought into abutment with the bearing face of said container side portion the label aperture of said label registers with the spindle aperture of said CD, the second major surface of said label in the centering section thereof being free of pressure sensitive adhesive whereby said centering section can be removed from said CD after the CD-adhering section of said label is affixed thereto.

4. The assembly of claim 3, wherein said mounting means includes a spindle for mounting said CD by means of the spindle aperture thereof.

5. The assembly of claim 3, wherein said lid is hingedly attached to said body portion on a first side of said container.

6. The assembly of claim 5, wherein said bearing face is also located on said first side of the container.

7. The assembly of claim 3, wherein said bearing face includes a flat section.

8. The assembly of claim 7, wherein said container has a top, a bottom and a plurality of sides therebetween, at least two of said sides defining a corner of said container, the outside edge of said label centering section being shaped to register with the two sides defining said corner.

9. The assembly of claim 8, wherein said outside edge includes at least two parallel edge sections.

10. The assembly of claim 3, said outside edge includes a curved section.

11. The assembly of claim 3, wherein said CD is round, wherein the CD-adhering section of said label is round, wherein said container is formed from plastic, and wherein said container is a portable storage container for storing no more than three CD's.

12. The assembly of claim 11, wherein said container is shaped to store only one CD.

13. A container and label assembly comprising
(1) a container for receiving a CD in fixed position therein, said container defining a bearing face facing a side of said CD when received in said container, said CD defining therein a spindle aperture for mounting said CD on the spindle of an electric recording or playback machine, and
(2) a label assembly for applying a label formed from said label assembly to said CD, said label assembly comprising a common flexible sheet of material having a first major surface and a second major surface opposite thereto, said sheet being divided into a label portion and a centering portion adjacent thereto, said centering portion being detachably connected to said label portion such that said centering portion can be detached from said label portion by hand,
said label portion defining a label aperture therein for registration with the spindle aperture of said CD when said label is properly mounted on said CD, the second major face of said sheet in said label portion carrying a layer of an adhesive for securing said label to said CD,
said centering portion having an engagement edge on a side thereof remote from said label portion, said centering portion being shaped such that when said sheet is arranged in said space with said engagement edge engaging said side bearing face, the label aperture of said label portion registers with the spindle aperture of said CD when said CD is received in said container.

14. The assembly of claim 13, wherein said sheet is perforated to define the boundary between said label portion and said centering portion.

15. The assembly of claim 14, further comprising a CD.

16. The assembly of claim 14, wherein said sheet is made from paper or plastic.

17. The assembly of claim 13, wherein said container includes:
(a) a container body for receiving said CD, said container body defining mounting means for mounting said CD in said space, said container body further defining said bearing face.

18. The assembly of claim 17, wherein said container includes
(b) a lid for opening and closing said container to allow said CD to be inserted into and removed from said container, and further wherein said the first major surface of said label portion is write-capable.

19. The assembly of claim 18, wherein said adhesive is a pressure-sensitive adhesive, and further wherein the second major surface of said label assembly in the centering portion thereof is free of pressure-sensitive adhesive whereby said centering portion can be removed from said CD after the CD-adhering portion of said label assembly is affixed thereto.

20. The assembly of claim 19, wherein said mounting means includes a spindle for mounting said CD by means of the spindle aperture thereof.

21. The assembly of claim 20, wherein said lid is hingedly attached to said body portion on a first side of said container.

22. The assembly of claim 21, wherein said bearing face is also located on said first side of the container.

23. The assembly of claim 19, wherein said bearing face includes a flat section.

24. The assembly of claim 23, wherein said container has a top, a bottom and a plurality of sides therebetween, at least two of said sides defining a corner of said container, the engagement edge of the centering portion of said label assembly being shaped to register with the two sides defining said corner.

25. The assembly of claim 24, wherein said engagement edge includes at least two parallel edge sections.

26. The assembly of claim 19, said engagement edge includes a curved section.

27. The assembly of claim 19, wherein said CD is round, wherein the CD-adhering portion of said label assembly is round, wherein said container is formed from plastic, and wherein said container is a portable storage container for storing no more than three CD's.

28. The assembly of claim 27, wherein said container is shaped to store only one CD.

29. The assembly of claim 27 further comprising a CD.

30. A label assembly for applying a label formed from said label assembly to a CD, said CD having a spindle aperture and being mounted in a container having an inside space for housing said CD therein, said container defining a bearing face facing a side of said CD when received in said inside space,
said label assembly comprising a flexible sheet of material having a first major surface and a second major surface opposite thereto, said sheet being divided into a label portion and a centering portion adjacent thereto, said centering portion being detachably connected to said label portion such that said centering portion can be removed from said label portion by hand,
said label portion defining a label aperture therein for registration with the spindle aperture of said CD when said label is properly mounted on said CD, the second major face of said sheet in said label portion carrying a layer of an adhesive for securing said label to said CD, said centering portion having an engagement edge on a side thereof remote from said label portion, said centering portion being shaped such that when said sheet is arranged in said space with said engagement edge engaging said side bearing face, the label aperture of said label portion registers with the spindle aperture of said CD.

the second major surface of said label assembly in the centering portion thereof being free of pressure-sensitive adhesive whereby said centering portion can be removed from said CD after the CD-adhering portion of said label assembly is affixed thereto;

wherein the first major surface of said label portion is write capable and the CD-adhering portion of said label assembly is round.

* * * * *